(12) United States Patent
Miller

(10) Patent No.: US 10,542,333 B2
(45) Date of Patent: Jan. 21, 2020

(54) TECHNOLOGIES FOR A LOW-LATENCY INTERFACE TO DATA STORAGE

(71) Applicant: Intel Corporation, Santa Clara, CA (US)

(72) Inventor: Steven C. Miller, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 15/396,028

(22) Filed: Dec. 30, 2016

(65) Prior Publication Data

US 2018/0024947 A1    Jan. 25, 2018

Related U.S. Application Data

(60) Provisional application No. 62/427,268, filed on Nov. 29, 2016, provisional application No. 62/376,859, (Continued)

(51) Int. Cl.
*G06F 16/901* (2019.01)
*H04Q 11/00* (2006.01)
(Continued)

(52) U.S. Cl.
CPC ...... *H04Q 11/0005* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01); *G06F 1/183* (2013.01); *G06F 3/061* (2013.01);
(Continued)

(58) Field of Classification Search
CPC .. G06F 11/141; G06F 13/161; G06F 13/1668; G06F 2212/1024
See application file for complete search history.

(56) References Cited

U.S. PATENT DOCUMENTS 8,756,375 B2 *  6/2014  Flynn ..................... G06F 1/183
                                                              711/103
2013/0297880 A1  11/2013  Flynn
(Continued)

FOREIGN PATENT DOCUMENTS

WO    2016-105790    6/2016

OTHER PUBLICATIONS

International search report for PCT application No. PCT/US2017/038318, dated Oct. 30, 2017 (8 pages).
(Continued)

*Primary Examiner* — Idriss N Alrobaye
*Assistant Examiner* — Richard B Franklin
(74) *Attorney, Agent, or Firm* — Barnes & Thornburg LLP

(57) ABSTRACT

Technologies for a low-latency interface with data storage of a storage sled in a data center are disclosed. In the illustrative embodiment, a storage sled stores metadata including the location of data in a storage device in low-latency non-volatile memory. When accessing data, the storage sled may access the metadata on the low-latency non-volatile memory and then, based on the location determined by the access to the metadata, access the location of the data in the storage device. Such an approach results in only one access to the data storage in order to read the data instead of two.

26 Claims, 18 Drawing Sheets

Related U.S. Application Data filed on Aug. 18, 2016, provisional application No. 62/365,969, filed on Jul. 22, 2016.

(51) Int. Cl.

| | | |
|---|---|---|
| H03M 7/30 | (2006.01) | |
| H03M 7/40 | (2006.01) | |
| G06F 3/06 | (2006.01) | |
| H04L 12/811 | (2013.01) | |
| G11C 7/10 | (2006.01) | |
| H05K 7/14 | (2006.01) | |
| G06F 1/18 | (2006.01) | |
| G06F 13/40 | (2006.01) | |
| H05K 5/02 | (2006.01) | |
| G08C 17/02 | (2006.01) | |
| H04L 12/24 | (2006.01) | |
| H04L 29/08 | (2006.01) | |
| H04L 12/26 | (2006.01) | |
| H04L 12/851 | (2013.01) | |
| G06F 9/50 | (2006.01) | |
| H04L 12/911 | (2013.01) | |
| G06F 12/109 | (2016.01) | |
| H04L 29/06 | (2006.01) | |
| G11C 14/00 | (2006.01) | |
| G11C 5/02 | (2006.01) | |
| G11C 11/56 | (2006.01) | |
| G02B 6/44 | (2006.01) | |
| G06F 8/65 | (2018.01) | |
| G06F 12/14 | (2006.01) | |
| G06F 13/16 | (2006.01) | |
| H04B 10/25 | (2013.01) | |
| G06F 9/4401 | (2018.01) | |
| G02B 6/38 | (2006.01) | |
| G02B 6/42 | (2006.01) | |
| B25J 15/00 | (2006.01) | |
| B65G 1/04 | (2006.01) | |
| H05K 7/20 | (2006.01) | |
| H04L 12/931 | (2013.01) | |
| H04L 12/939 | (2013.01) | |
| H04W 4/02 | (2018.01) | |
| H04L 12/751 | (2013.01) | |
| G06F 13/42 | (2006.01) | |
| H05K 1/18 | (2006.01) | |
| G05D 23/19 | (2006.01) | |
| G05D 23/20 | (2006.01) | |
| H04L 12/927 | (2013.01) | |
| H05K 1/02 | (2006.01) | |
| H04L 12/781 | (2013.01) | |
| H04Q 1/04 | (2006.01) | |
| G06F 12/0893 | (2016.01) | |
| H05K 13/04 | (2006.01) | |
| G11C 5/06 | (2006.01) | |
| G06F 11/14 | (2006.01) | |
| G06F 11/34 | (2006.01) | |
| G06F 12/0862 | (2016.01) | |
| G06F 15/80 | (2006.01) | |
| H04L 12/919 | (2013.01) | |
| G06F 12/10 | (2016.01) | |
| G06Q 10/06 | (2012.01) | |
| G07C 5/00 | (2006.01) | |
| H04L 12/28 | (2006.01) | |
| H04L 29/12 | (2006.01) | |
| H04L 9/06 | (2006.01) | |
| H04L 9/14 | (2006.01) | |
| H04L 9/32 | (2006.01) | |
| H04L 12/933 | (2013.01) | |
| H04L 12/947 | (2013.01) | |
| G06F 9/30 | (2018.01) | |
| G06F 9/38 | (2018.01) | |
| G06F 9/54 | (2006.01) | |
| H04W 4/80 | (2018.01) | |
| G06Q 10/08 | (2012.01) | |
| G06Q 10/00 | (2012.01) | |
| G06Q 50/04 | (2012.01) | |

(52) U.S. Cl.
CPC .............. *G06F 3/064* (2013.01); *G06F 3/067* (2013.01); *G06F 3/0611* (2013.01); *G06F 3/0613* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01); *G06F 3/0653* (2013.01); *G06F 3/0655* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/3887* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 9/544* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 16/9014* (2019.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3084* (2013.01); *H03M 7/3086* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01); *H04L 43/0876* (2013.01); *H04L 43/0894* (2013.01); *H04L 43/16* (2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01);

H04L 49/00 (2013.01); H04L 49/15 (2013.01); H04L 49/25 (2013.01); H04L 49/357 (2013.01); H04L 49/45 (2013.01); H04L 49/555 (2013.01); H04L 67/02 (2013.01); H04L 67/10 (2013.01); H04L 67/1004 (2013.01); H04L 67/1008 (2013.01); H04L 67/1012 (2013.01); H04L 67/1014 (2013.01); H04L 67/1029 (2013.01); H04L 67/1034 (2013.01); H04L 67/1097 (2013.01); H04L 67/12 (2013.01); H04L 67/16 (2013.01); H04L 67/306 (2013.01); H04L 67/34 (2013.01); H04L 69/04 (2013.01); H04L 69/329 (2013.01); H04Q 1/04 (2013.01); H04Q 11/00 (2013.01); H04Q 11/0003 (2013.01); H04Q 11/0062 (2013.01); H04Q 11/0071 (2013.01); H04W 4/023 (2013.01); H05K 1/0203 (2013.01); H05K 1/181 (2013.01); H05K 5/0204 (2013.01); H05K 7/1418 (2013.01); H05K 7/1421 (2013.01); H05K 7/1422 (2013.01); H05K 7/1442 (2013.01); H05K 7/1447 (2013.01); H05K 7/1461 (2013.01); H05K 7/1487 (2013.01); H05K 7/1489 (2013.01); H05K 7/1491 (2013.01); H05K 7/1492 (2013.01); H05K 7/1498 (2013.01); H05K 7/2039 (2013.01); H05K 7/20709 (2013.01); H05K 7/20727 (2013.01); H05K 7/20736 (2013.01); H05K 7/20745 (2013.01); H05K 7/20836 (2013.01); H05K 13/0486 (2013.01); G06F 2209/5019 (2013.01); G06F 2209/5022 (2013.01); G06F 2212/1008 (2013.01); G06F 2212/1024 (2013.01); G06F 2212/1041 (2013.01); G06F 2212/1044 (2013.01); G06F 2212/152 (2013.01); G06F 2212/202 (2013.01); G06F 2212/401 (2013.01); G06F 2212/402 (2013.01); G06F 2212/7207 (2013.01); G06Q 10/087 (2013.01); G06Q 10/20 (2013.01); G06Q 50/04 (2013.01); G08C 2200/00 (2013.01); H04B 10/25 (2013.01); H04L 41/12 (2013.01); H04L 41/5019 (2013.01); H04L 43/065 (2013.01); H04Q 2011/0037 (2013.01); H04Q 2011/0041 (2013.01); H04Q 2011/0052 (2013.01); H04Q 2011/0073 (2013.01); H04Q 2011/0079 (2013.01); H04Q 2011/0086 (2013.01); H04Q 2213/13523 (2013.01); H04Q 2213/13527 (2013.01); H04W 4/80 (2018.02); H05K 7/1485 (2013.01); H05K 2201/066 (2013.01); H05K 2201/10121 (2013.01); H05K 2201/10159 (2013.01); H05K 2201/10189 (2013.01); Y02D 10/14 (2018.01); Y02D 10/151 (2018.01); Y02P 90/30 (2015.11); Y04S 10/54 (2013.01); Y10S 901/01 (2013.01)

(56) References Cited

U.S. PATENT DOCUMENTS

| | | |
|---|---|---|
| 2014/0136770 A1 | 5/2014 | Fitch et al. |
| 2015/0193337 A1 | 7/2015 | Kimmel |
| 2016/0011802 A1 | 1/2016 | Berke |

OTHER PUBLICATIONS

Written opinion for PCT application No. PCT/US2017/038318, dated Oct. 30, 2017 (8 pages).

* cited by examiner

*Data Center 100*

TECHNOLOGIES FOR A LOW-LATENCY INTERFACE TO DATA STORAGE

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

A data center may create and manage large amounts of data. Accessing data with low latency leads to improved performance as compared to accessing data with a higher latency. In some cases, accessing data on a hard drive may require two reads to the hard drive, a first read to access metadata and a second read to access the desired data at the location specified by the metadata.

In a data center, in order to ensure that data is not lost, several copies of data may be stored before the data is considered to be durably or permanently stored. In some cases, performance of computing tasks may depend on the latency associated with durably storing data. Lowering the latency for durable storage of data may improve the performance of such computing tasks.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
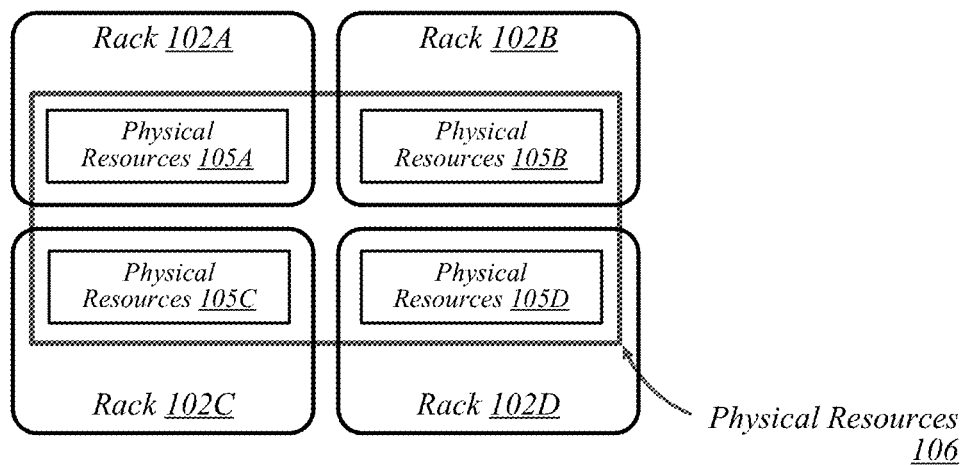
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as Dual In-line Memory Modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, Application Specific Integrated Circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
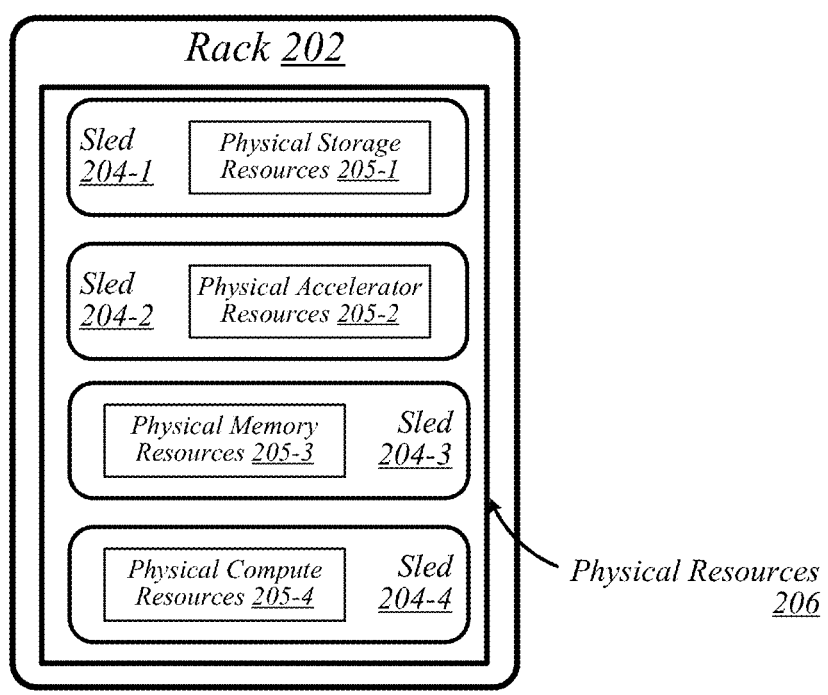
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
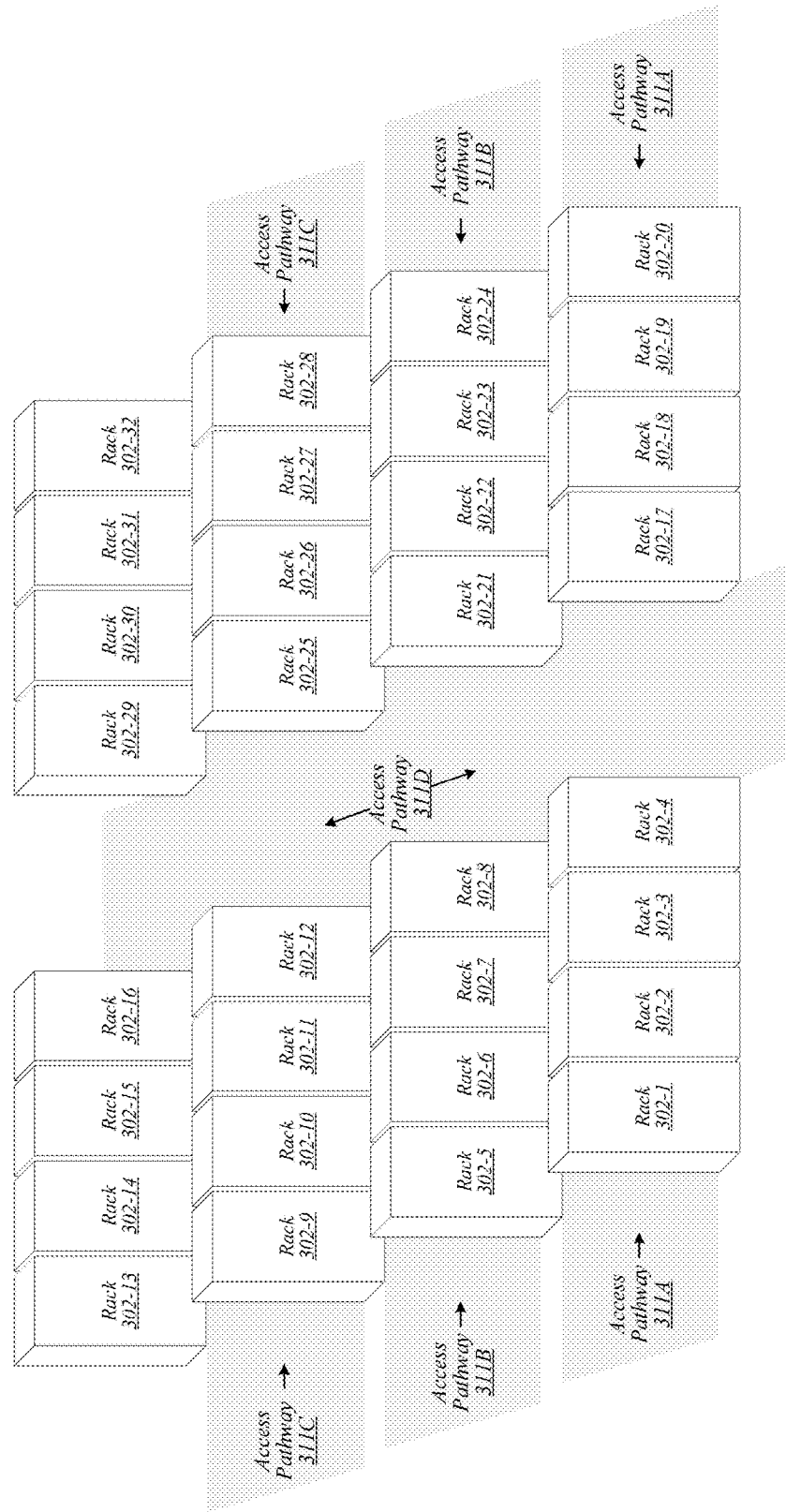
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
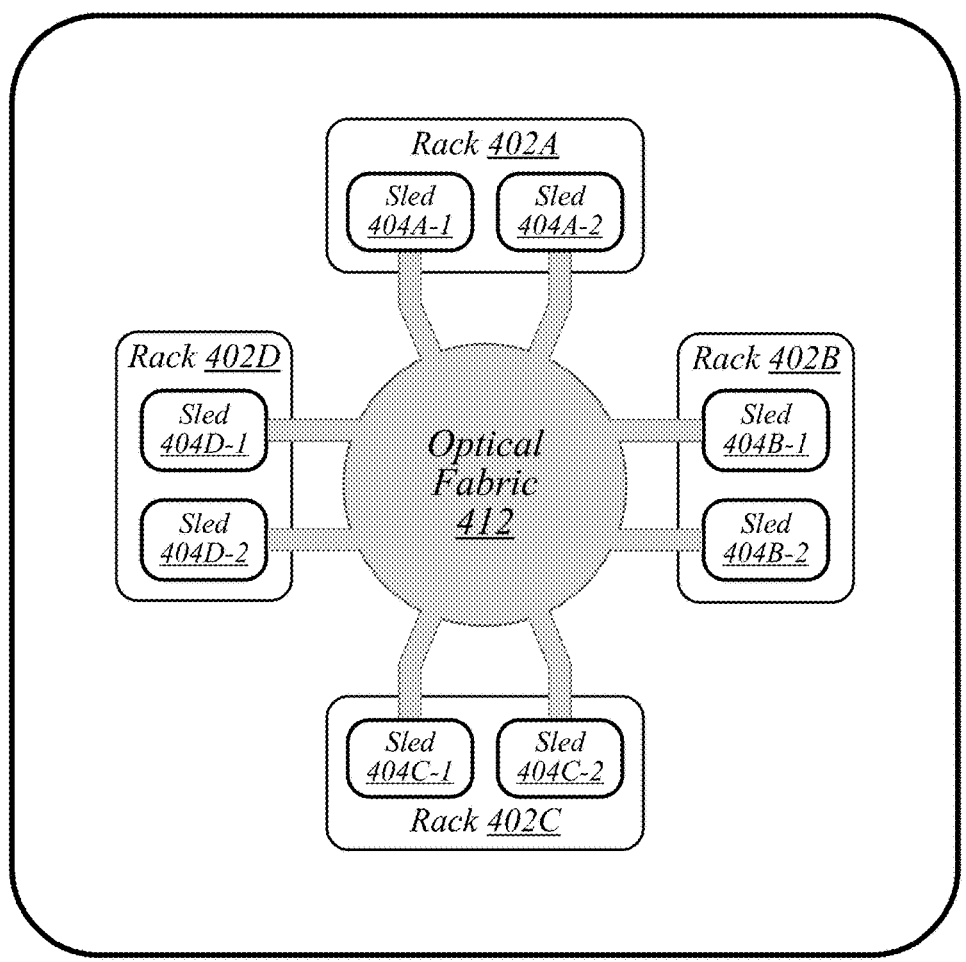
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
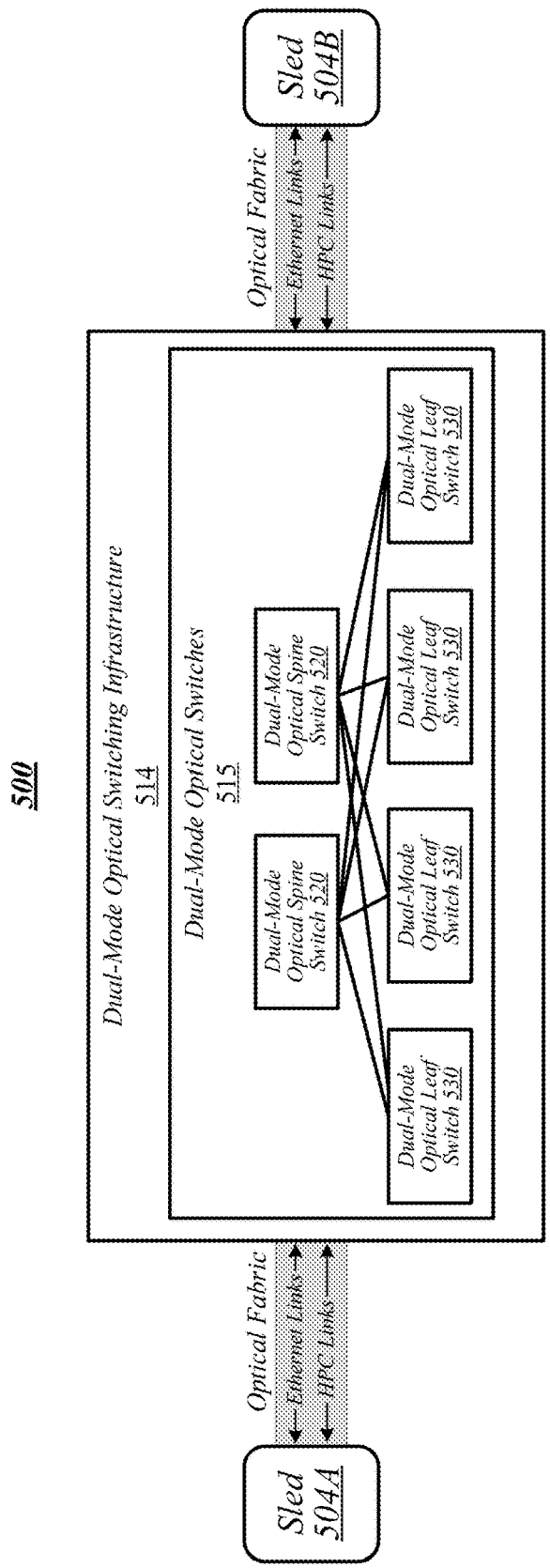
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
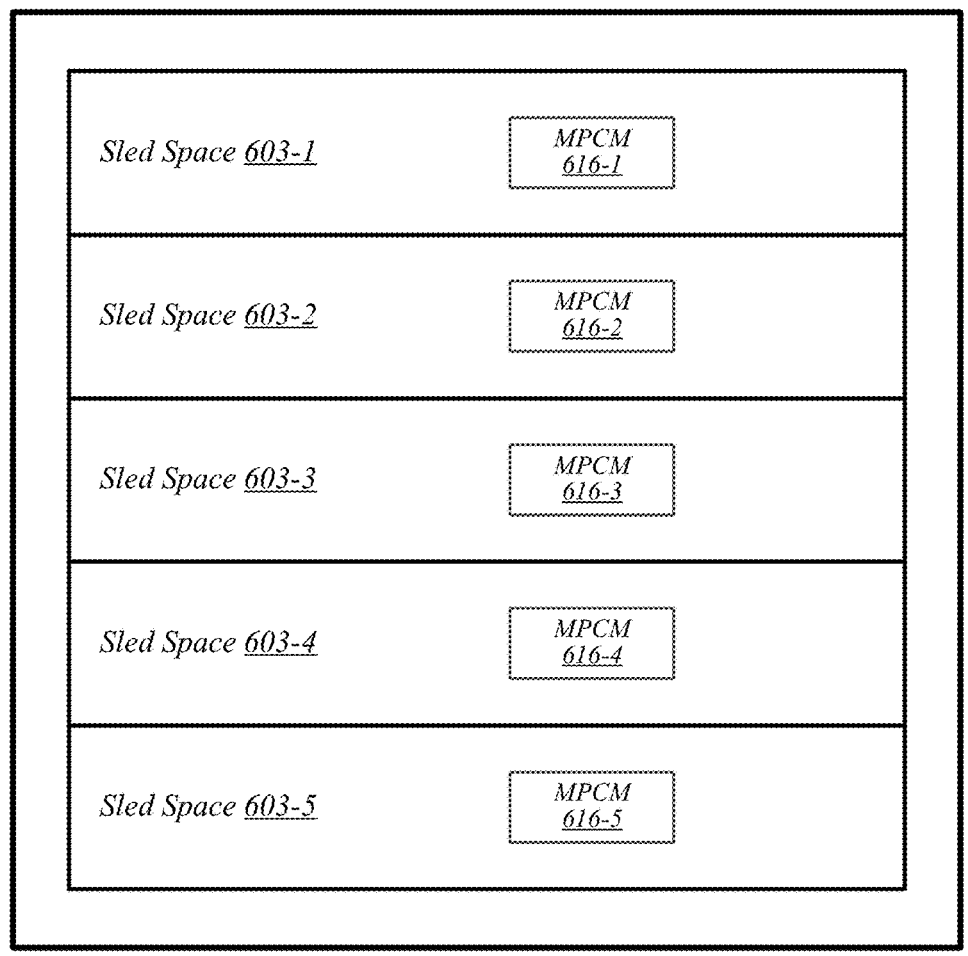
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
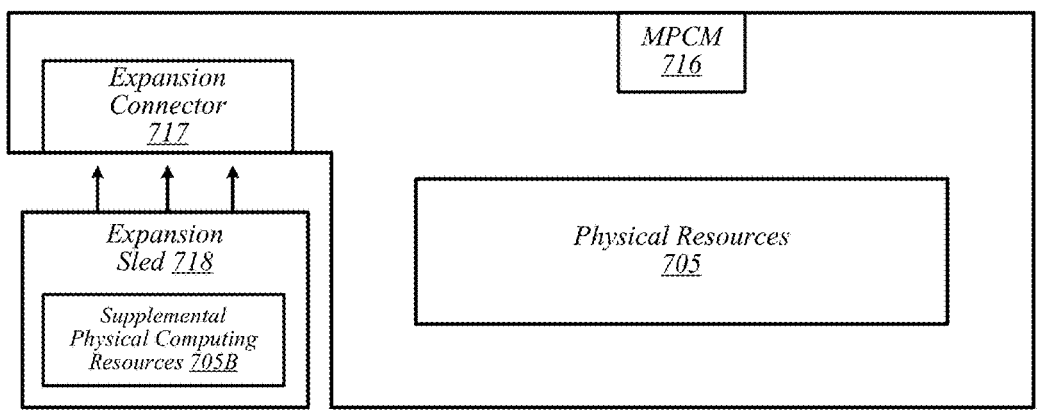
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
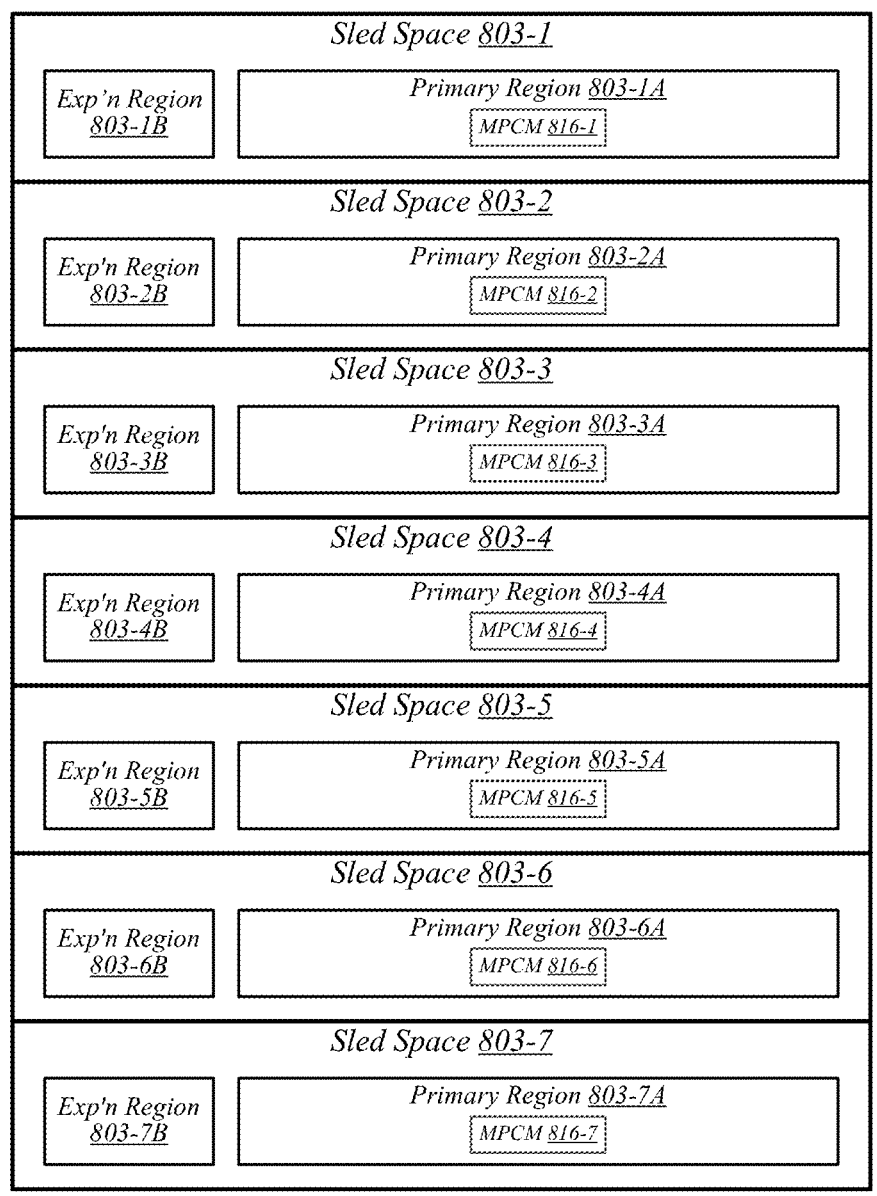
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
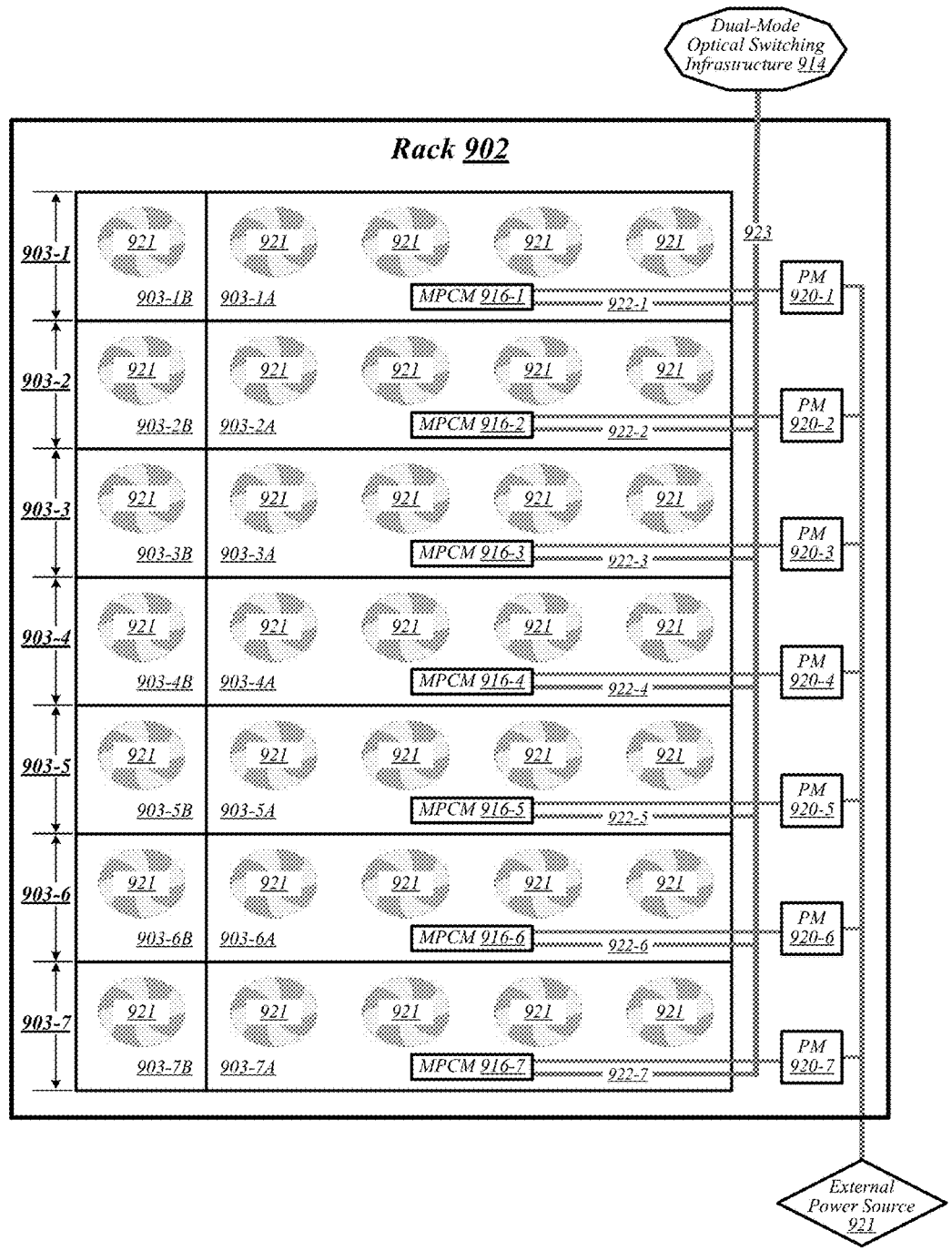
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
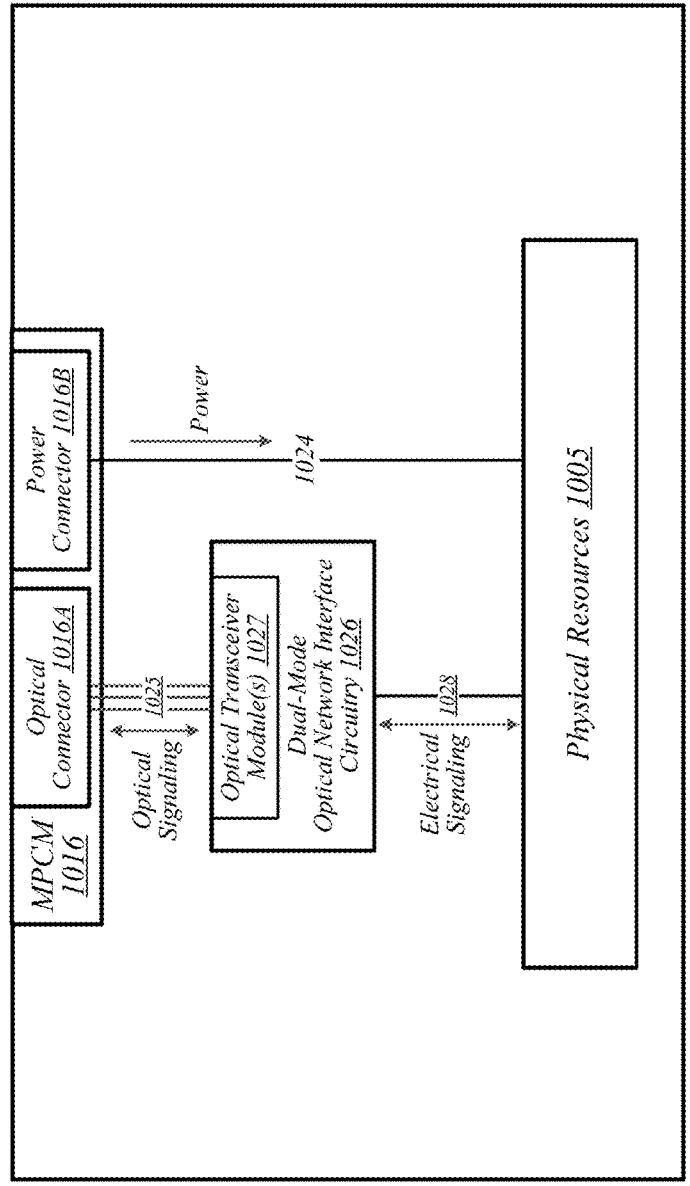
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
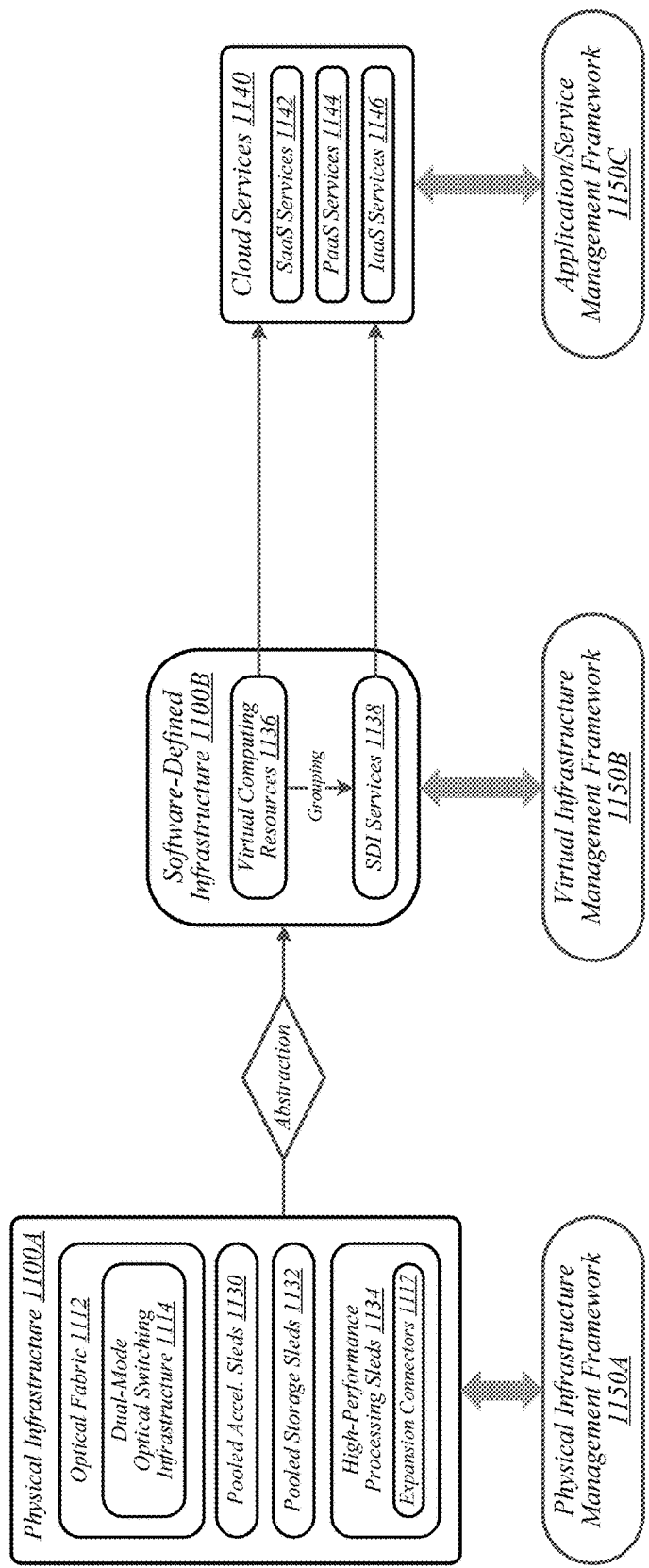
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to— optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
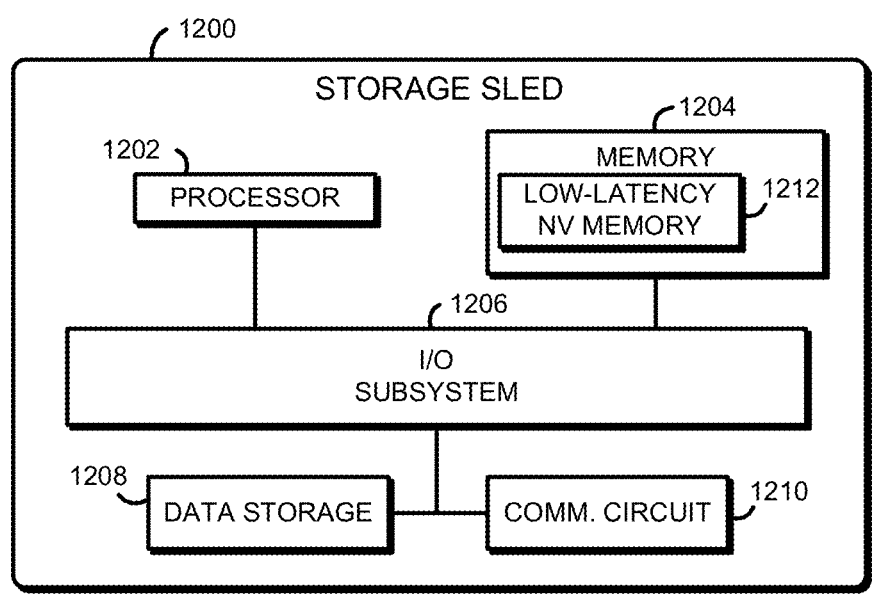
FIG. 12 is a simplified block diagram of at least one embodiment of a storage sled of the data center of FIG. 1.

Referring now to FIGS. 12-19, as discussed above, one or more of the sleds 204, 404, 504, 704, 1004 of the data center 100, 300, 400 may be embodied as a storage sled for storing data. An illustrative storage sled 1200 usable in the data center 100, 300, 400 is shown in FIG. 12. During operation, the storage sled 1200 may receive data for storage on the data storage 1208. In one embodiment, the storage sled 1200 may write the data to a locally-managed data storage 1208 and also write metadata including the location of the data in a low-latency non-volatile memory 1212 maintained on the storage sled 1200. When the storage sled 1200 receives a request for the data, the storage sled 1200 may access the metadata and, based on the metadata, access the location on the data storage 1208 containing the data. Such a configuration avoids a second access to the data storage 1208 to retrieve the metadata, which would otherwise take additional time for the additional access to the data storage 1208. Additionally or alternatively, in another embodiment, the storage sled 1200 may receive durable data for permanent storage on the data storage 1208. As used herein, durable data refers to data that is to be written in a manner that it is protected from device failure (e.g., stored in several independent devices). The storage sled 1200 may initially store the durable data in the low-latency non-volatile memory 1212 of the storage sled 1200, and send a confirmation of receipt of the durable data. After sending the confirmation, the storage sled 1200 may then copy the durable data to the data storage 1208 for permanent storage. Such an approach may allow the storage sled 1200 to send a confirmation of receipt of the data without waiting for the relatively long latency of storing the durable data in the data storage 1208.

Referring specifically now to FIG. 12, an illustrative storage sled 1200 includes a processor 1202, memory 1204, an input/output (I/O) subsystem 1206, data storage 1208, and a communication circuit 1210. In some embodiments, one or more of the illustrative components of the storage sled 1200 may be incorporated in, or otherwise form a portion of, another component. For example, the memory 1204, or portions thereof, may be incorporated in the processor 1202 in some embodiments.

The processor 1202 may be embodied as any type of processor capable of performing the functions described herein. For example, the processor 1202 may be embodied as a single or multi-core processor(s), a single or multi-socket processor, a digital signal processor, a graphics processor, a microcontroller, or other processor or processing/controlling circuit. Similarly, the memory 1204 may be embodied as any type of volatile or non-volatile memory or data storage capable of performing the functions described herein. In operation, the memory 1204 may store various data and software used during operation of the storage sled 1200 such as operating systems, applications, programs, libraries, and drivers. The memory 1204 is communicatively coupled to the processor 1202 via the I/O subsystem 1206, which may be embodied as circuitry and/or components to facilitate input/output operations with the processor 1202, the memory 1204, and other components of the storage sled 1200. For example, the I/O subsystem 1206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

Figure 14:
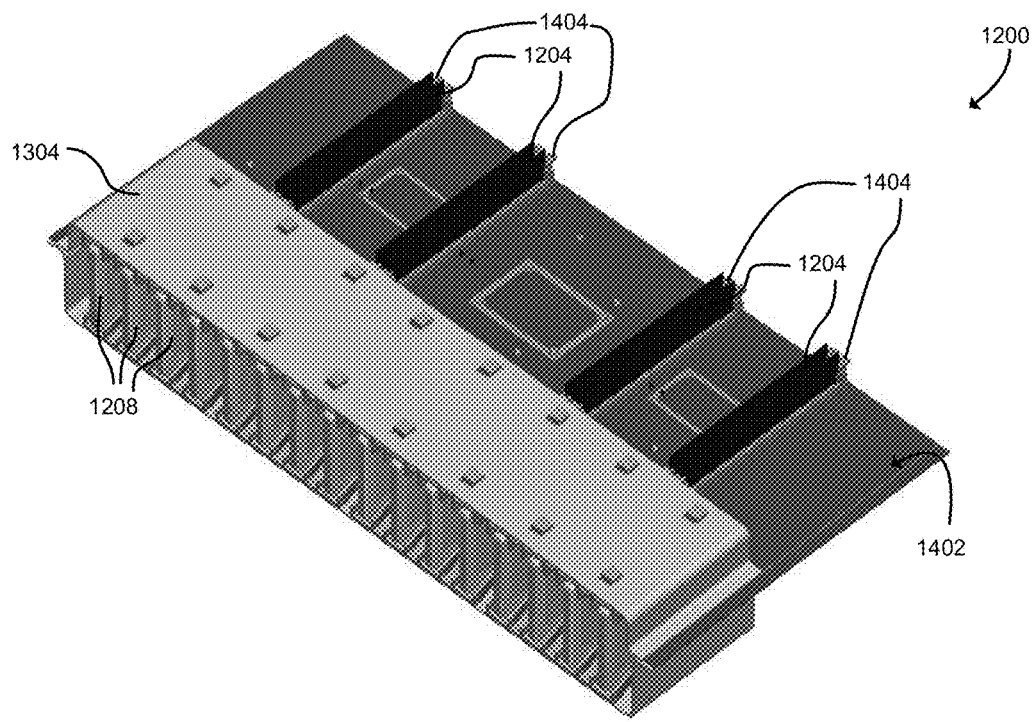
FIG. 14 is a bottom perspective view of an example embodiment of a storage sled of FIG. 12.

The memory includes low-latency non-volatile memory 1212. The low-latency non-volatile memory 1212 may be embodied as any type of low-latency non-volatile memory that meets the performance requirements described herein. For example, the low-latency non-volatile memory 1212 may be embodied as any combination of memory devices that use chalcogenide phase change material (e.g., chalcogenide glass), 3-dimensional (3D) cross point memory, or other types of byte-addressable, write-in-place non-volatile memory, ferroelectric transistor random-access memory (FeTRAM), nanowire-based non-volatile memory, phase change memory (PCM), memory that incorporates memristor technology, magnetoresistive random-access memory (MRAM) or Spin Transfer Torque MRAIVI (STT-MRAM). In the illustrative embodiment, the memory 1204 may include a relatively small amount of volatile memory (e.g., dynamic random access memory (DRAM)), such as several gigabytes to several tens of gigabytes, and include a relatively large amount of low-latency non-volatile memory 1212, such as several terabytes to several tens of terabytes. For example, the low-latency non-volatile memory 1212 may include at least 1, 2, 5, 10, 20, 50 or 100 terabytes of memory capacity, all stored on a single storage sled 1200. The memory 1204 (including the low-latency non-volatile memory 1212) may be embodied as any form factor compatible with the storage sled 1200. In the illustrative embodiment, the memory 1204 (including the low-latency non-volatile memory 1212) is embodied as several dual in-line memory modules (DIMMs), as shown in FIG. 14. The latency of the low-latency non-volatile memory 1212 may be any latency consistent with the functionality described herein. For example, the latency of the low-latency non-volatile memory 1212 may be more or less than 0.1, 0.5, 1, 2, 5, or 10 microseconds. It should be appreciated that, as used herein, latency may refer either to the read latency or the write latency, unless specifically noted otherwise. In the illustrative embodiment, the latency of the low-latency non-volatile memory 1212 is less than the latency to access the data storage 1208. For example, the latency of the low-latency non-volatile memory 1212 may be less than the latency of the data storage 1208 by a factor of 2, 5, 10, 20, 50, 100, 200, 500, or 1,000.

The data storage 1208 may be embodied as any type of device or devices configured for the short-term or long-term storage of data. For example, the data storage 1208 may include any one or more memory devices and circuits, memory cards, hard disk drives, solid-state drives, or other data storage devices. In some examples, the data storage 1208 is embodied as several NAND flash storage devices. Additionally or alternatively, the data storage 1208 may be embodied as devices that use chalcogenide phase change material (e.g., chalcogenide glass), 3D cross point memory, or other types of byte-addressable, write-in-place non-volatile memory, FeTRAM, nanowire-based non-volatile memory, PCM, memory that incorporates memristor technology, MRAM or STT-MRAM. The data storage 1208 may include a relatively large amount of storage capacity, such as over 100, 200, or 500 terabytes or over 1, 2 or 5 petabytes. In some embodiments, the capacity of the low-latency non-volatile memory 1212 may be at least a certain fraction of the capacity of the data storage 1208, such as 0.1%, 0.2%, 0.25%, 0.5%, or 1%. The latency of the data storage 1208 may be more or less than 5, 10, 20, 50, 100, 200, or 500 microseconds.

The communication circuit 1210 may be embodied as any type of communication circuit, device, or collection thereof, capable of enabling communications between the storage sled 1200 and other devices. To do so, the communication circuit 1210 may be configured to use any one or more communication technology and associated protocols (e.g., Ethernet, Bluetooth®, Wi-Fi®, WiMAX, near field communication (NFC), etc.) to effect such communication. In the illustrative embodiment, the communication circuit 1210 includes an optical communicator capable of sending and receiving at a high rate, such as a rate of 20, 25, 50, 100, or 200 Gigabits per second (Gbps).

It should be appreciated that, in the illustrative embodiment, the data center (e.g. the data center 100, 300, 400) may include additional sleds, such as accelerator sleds 205-2, memory sleds 205-3, compute sleds 205-4, etc. Each of the various sleds may be configured to be optimized for performing particular tasks, such as compute tasks, memory storage tasks, data storage tasks, etc. For example, a compute sled 205-4 may be configured to be optimized for performing compute tasks, and may include several high-speed processors and large amounts of high-speed memory with little or no data storage, and the storage sled 1200 is configured to be optimized for performing storage tasks, and may include a large amount of data storage 1208 with relatively slow processors 1202 as compared to the processors and data storage of the compute sled 205-4.

It should be appreciated that the embodiments of the storage sled 1200 described in FIG. 12 are not limiting. For example, in some embodiments, the storage sled 1200 may be embodied as a sled 704 as shown in FIG. 7, a sled 1004 as shown in FIG. 10, or any combination of the sleds 704, 1004, and 1200. Of course, any embodiment of the storage sled 1200 will include the resources necessary (such as the low-latency non-volatile memory 1212) to perform the particular task required for a particular embodiment.

Figure 13:
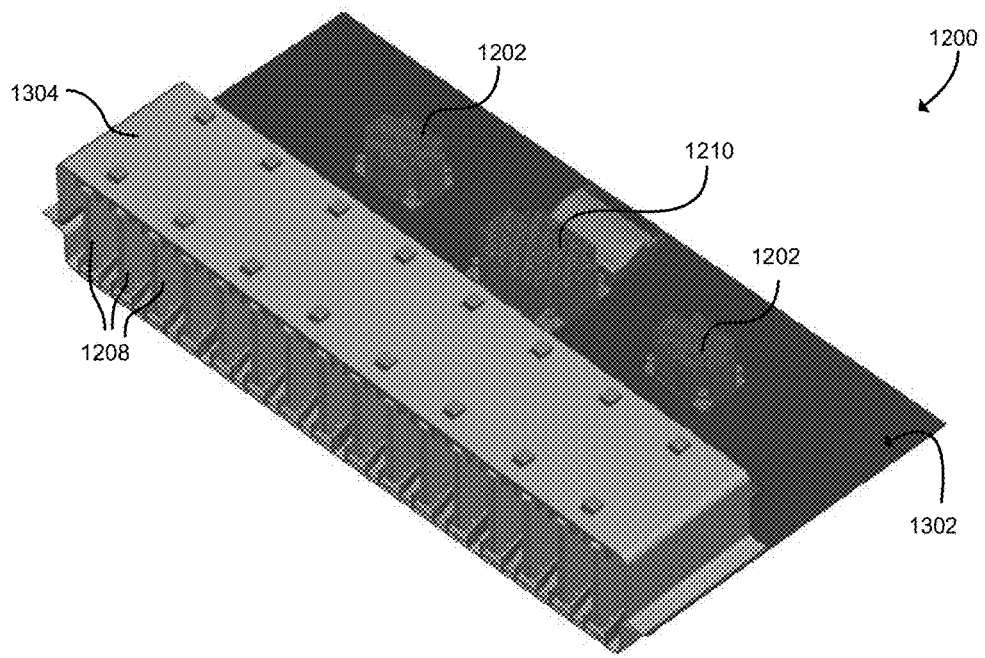
FIG. 13 is a top perspective view of an example embodiment of a storage sled of FIG. 12.

Referring now to FIG. 13, a top perspective view of an illustrative storage sled 1200 is shown. As illustrated, the storage sled 1200 includes a top side 1302. The illustrative storage sled 1200 includes two processors 1202 and a communication circuit 1210 positioned on the top side 1402. The storage sled 1200 further includes a storage cage 1304 positioned at one end of the storage sled 1200 that includes the physical data storage 1208. In some examples, the illustrative storage sled 1200 shown in FIG. 13 may include sixteen SSDs mounted to slots in the storage cage 1304.

Referring now to FIG. 14, a bottom perspective view of the illustrative storage sled 1200 is shown. As illustrated, the storage sled 1200 also includes a bottom side 1402. The storage sled 1200 includes memory 1204 positioned within slots 1404 on the bottom side 1402. In some examples, memory 1204 may include multiple DIMMS. For these examples, each DIMM may include both volatile memory (e.g., DRAM) and the low-latency non-volatile memory 1212.

Figure 15:
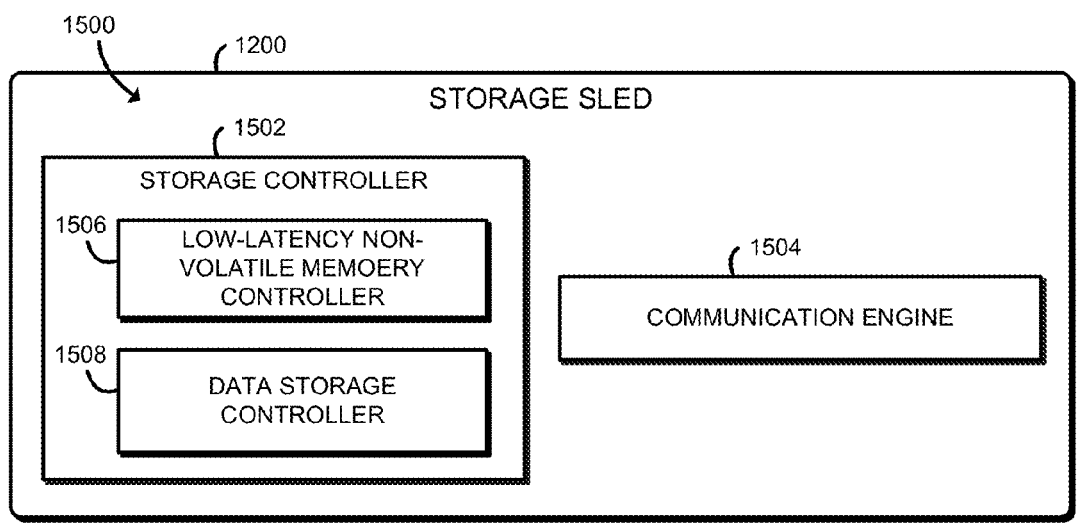
FIG. 15 is an environment that may be established by the storage sled of FIG. 13.

Referring now to FIG. 15, in use, the storage sled 1200 may establish an environment 1500. The illustrative environment 1500 includes a storage controller 1502 and a communication engine 1504. The various components of the environment 1500 may be embodied as hardware, firmware, software, or a combination thereof. As such, in some embodiments, one or more of the components of the environment 1500 may be embodied as circuitry or collection of electrical devices (e.g., a storage controller circuit 1502, a communication engine 1504, etc.). It should be appreciated that, in such embodiments, the storage controller circuit 1502, the communication engine 1504, etc., may form a portion of one or more of the processor 1202, the memory 1204, the I/O subsystem 1206, the data storage 1208, communication circuit 1210, the low-latency non-volatile memory 1212, and/or other components of the storage sled 1200. For example, in an illustrative embodiment, the storage controller 1502 is embodied as, or forms a portion of, one or more processors 1202. Additionally, in some embodiments, one or more of the illustrative components may form a portion of another component and/or one or more of the illustrative components may be independent of one another. Further, in some embodiments, one or more of the components of the environment 1500 may be embodied as virtualized hardware components or emulated architecture, which may be established and maintained by the processor 1202 or other components of the storage sled 1200.

The storage controller 1502 is configured to manage any requests for storage or retrieval of data received by the communication circuit 1210. In the illustrative embodiment, when the storage sled 1200 receives data for storage, the storage controller 1502 stores the data in the data storage 1208, and stores metadata associated with the data (e.g., indicating a location on the data storage 1208 at which the data was stored) both in the data storage 1208 as well as the low-latency non-volatile memory 1212. In such an embodiment, when the storage sled 1200 receives a request for the data, the storage controller 1502 accesses the metadata in the low-latency non-volatile memory 1212, and then accesses the indicated location of the data storage 1208 to read the data. Additionally or alternatively, in some embodiments, when the storage sled 1200 receives durable data, the storage controller 1502 may write the durable data to the low-latency non-volatile memory 1212, and then send a confirmation of receipt of the data to the device which sent the durable data for storage. The storage controller 1502 can then write the durable data to the data storage 1208 for permanent storage. In some embodiments, the storage controller 1502 may send a copy of the durable data to another storage sled 1200 and wait for an acknowledgement prior to sending the confirmation of receipt of the durable data, in order to ensure redundant storage of the durable data before confirming its receipt. It should be appreciated that, since the low-latency non-volatile memory 1212 is non-volatile, it will maintain its contents if there is a loss of power (e.g., a power failure to the data center 100) or other failure causing a reset of the storage sled 1200. In such a scenario, upon restarting the storage sled 1200, the storage controller 1502 can check for any durable data stored in the low-latency non-volatile memory 1212 that has not been written to the data storage 1208 (e.g., by checking flags or other indicators that the data had not yet been written to the data storage 1208), then the storage controller 1502 can copy that durable data to the data storage 1208 for permanent storage.

The storage controller 1502 includes a low-latency non-volatile memory controller 1506 and a data storage controller 1508. The low-latency non-volatile memory controller 1506 is configured to manage data being written to and read from the low-latency non-volatile memory 1212 and to perform any other necessary management of the low-latency non-volatile memory 1212. In the illustrative embodiments, the low-latency non-volatile memory controller 1506 is configured to encrypt all data being stored on the low-latency non-volatile memory 1212 and decrypt all data being read from the low-latency non-volatile memory 1212. The encryption and decryption in the illustrative embodiment is done automatically by the low-latency non-volatile memory 1212 and is transparent to the rest of the storage sled 1200. In some embodiments, the storage controller 1502 and/or the low-latency non-volatile memory controller 1506 may load a particular encryption key into the low-latency non-volatile memory 1212, such as an encryption key permanently stored in the data storage 1208. Additionally or alternatively, in some embodiments, the low-latency non-volatile memory controller 1506 may generate a new, random encryption key, and store it in volatile memory (such as in a volatile portion of the memory 1202). It should be appreciated that, upon a loss of power or other reset of the storage sled 1200, the encryption key stored in the volatile memory will be lost, effectively erasing the low-latency non-volatile memory 1212. When the low-latency non-volatile memory controller 1506 uses a volatile encryption key, the low-latency non-volatile memory 1212 may be said to be in "two-level memory" mode, since the low-latency non-volatile memory 1212 behaves as if it is volatile (due to the volatility of the encryption key), as an application might expect if it is using the low-latency non-volatile memory 1212 like memory in a manner similar to DRAM memory. When the low-latency non-volatile memory controller 1506 uses a non-volatile encryption key, the low-latency non-volatile memory 1212 may be said to be in "application direct" mode, since the low-latency non-volatile memory 1212 behaves as if it is non-volatile, as an application might expect if it is using the low-latency non-volatile memory 1212 in a similar manner as the data storage 1208. In some embodiments, the storage controller 1502 may allocate one portion of the low-latency non-volatile memory 1212 for use with the volatile encryption key and another portion of the low-latency non-volatile memory 1212 for use with the non-volatile encryption key. Of course, in some embodiments, the low-latency non-volatile memory controller 1506 may not encrypt some or all of the locations of the low-latency non-volatile memory 1212.

The data storage controller 1508 is configured to manage storing and reading data to and from the data storage 1208. The data storage controller 1508 may manage aspects such as managing where data is written, managing metadata of the data, moving data around for optimization such as garbage collection, etc.

The communication engine 1504 is configured to send and receive data using the communication circuit 1210. The communication engine 1504 may use any appropriate protocol to send and receive data.

Figure 16:
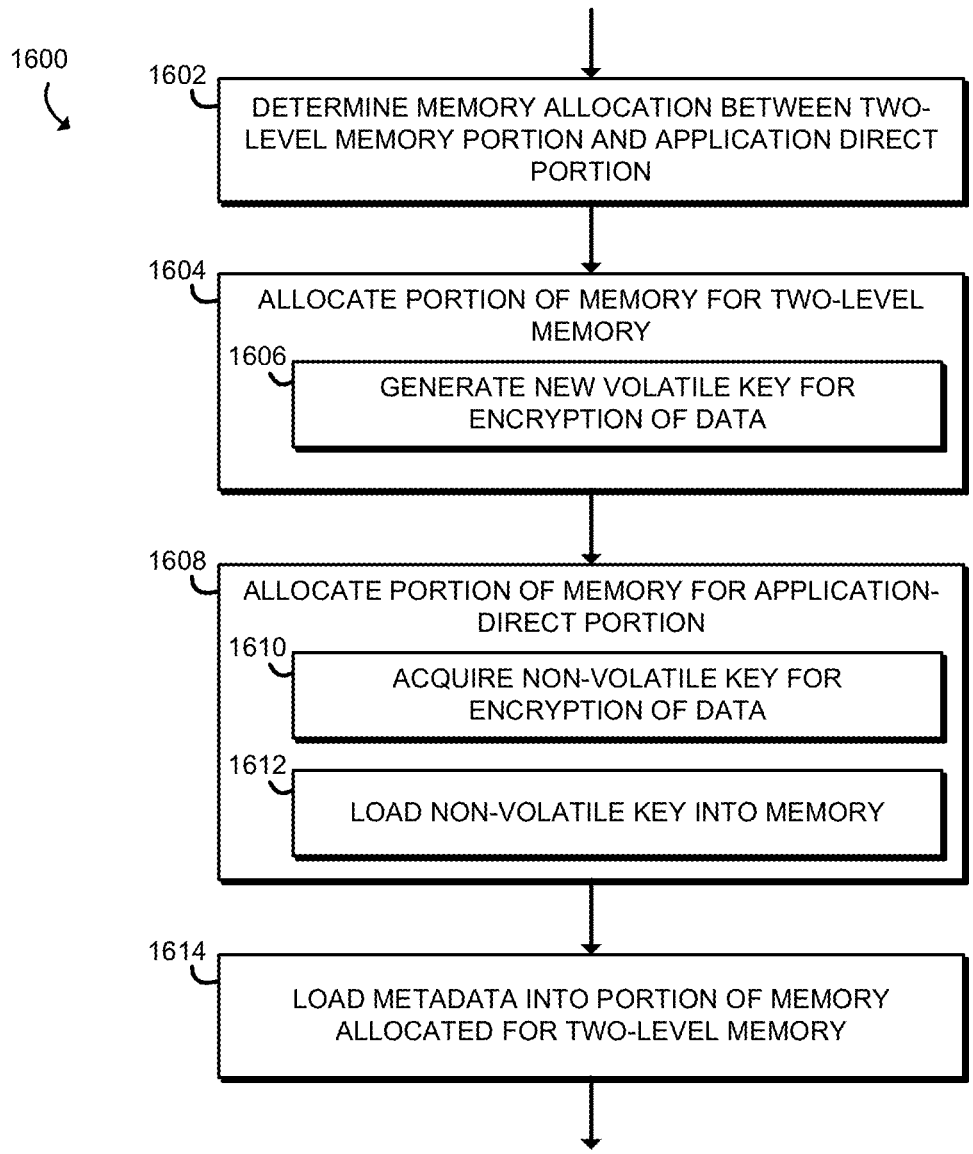
FIG. 16 is at least one embodiment of a flowchart of a method for configuring a memory of the storage sled of FIG. 12.

Referring now to FIG. 16, in use, the storage sled 1200 may execute a method 1600 for initializing the low-latency non-volatile memory 1212. The method 1600 begins in block 1602, in which the storage sled 1200 determines a memory allocation between a two-level memory portion and an application direct portion of the low-latency non-volatile memory 1212.

In block 1604, the storage sled 1200 allocates a portion of the low-latency non-volatile memory 1212 for two-level memory. In block 1606, the storage sled 1200 generates a new volatile key for encrypting data in the two-level memory portion.

In block 1606, the storage sled 1200 allocates a portion of the low-latency non-volatile memory 1212 for application direct memory. The storage sled 1200 acquires a non-volatile key for encrypting data in the application direct portion (from, e.g., the data storage 1208) in block 1610 and loads the non-volatile key into the low-latency non-volatile memory 1212 in block 1612. In block 1614, the storage sled loads metadata from the data storage 1208 into the portion of the memory allocated for two-level memory. The metadata may be embodied as any type of data that indicates how the data storage 1208 is organized, such as the location of data stored in the data storage 1208, what locations of the data storage 1208 are available to be written, etc.

Figure 17:
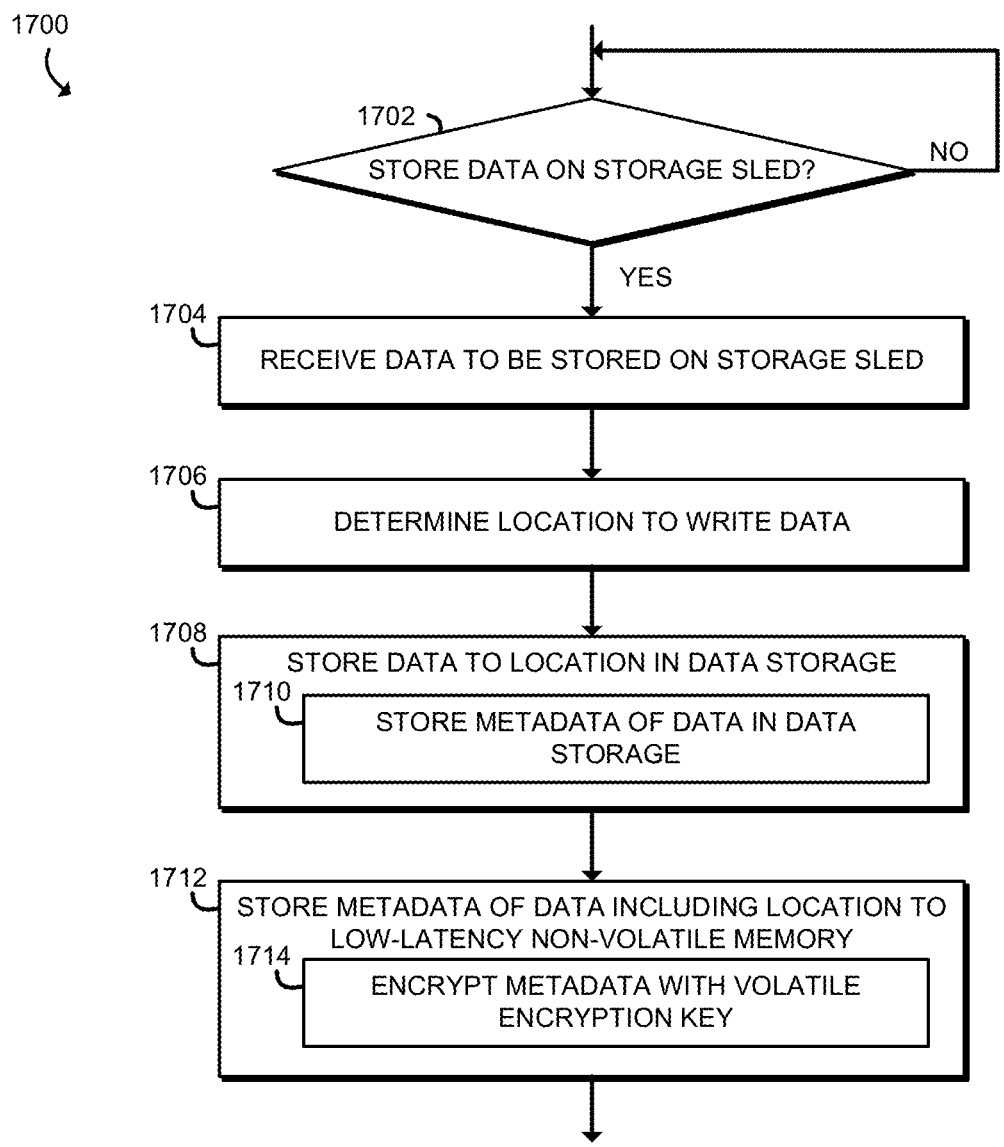
FIG. 17 is at least one embodiment of a flowchart of a method for storing data and corresponding metadata on the storage sled of FIG. 12.

Referring now to FIG. 17, in use, the storage sled 1200 may execute a method 1700 for storing data on the storage sled 1200. The method 1700 begins in block 1702, in which, if the storage sled 1200 is to store data (e.g., a request to store data was received by the communication circuit 1210), the method proceeds to block 1704. Otherwise, if the storage sled 1200 is not to store data (e.g., no request for storing data was received), the method 1700 loops back to block 1702 in which the storage sled 1200 continues to monitor for a storage request.

In block 1704, the storage sled 1200 receives the data to be stored on the storage sled. In block 1706, the storage sled 1200 determines a location at which to write the data, such as by accessing metadata in the low-latency non-volatile memory 1212 or in the data storage 1208 indicating a free location at which to store the data.

In block 1708, the storage sled 1200 stores the data in the data storage 1208 at the location determined in block 1706. In block 1710, in some embodiments, the storage sled 1200 stores the metadata indicating the location of the storage the data storage 1208.

In block 1712, the storage sled 1200 stores the metadata including the location of the storage in the low-latency non-volatile memory 1212. In some embodiments, the storage sled 1200 may encrypt the metadata with a volatile encryption key prior to storing the metadata in the low-latency non-volatile memory 1212 in block 1714.

Figure 18:
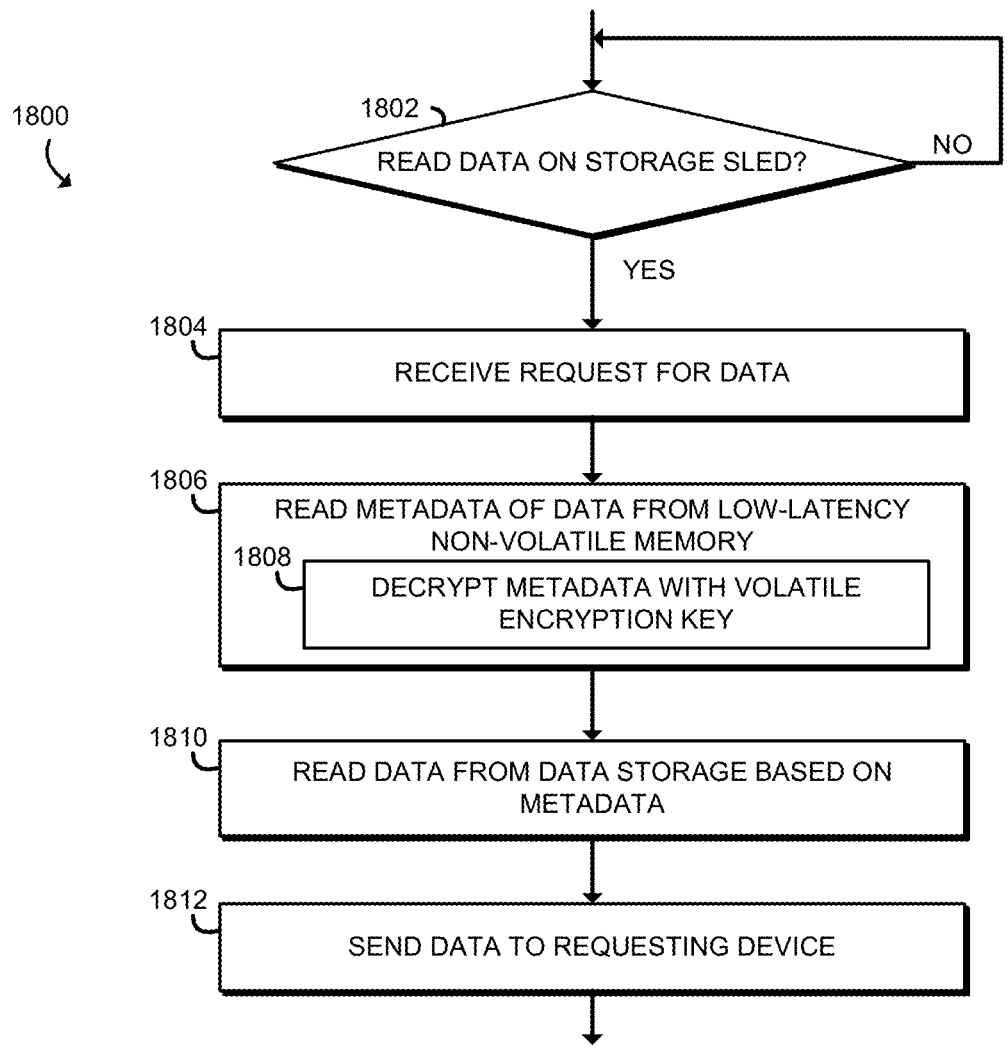
FIG. 18 is at least one embodiment of a flowchart of a method for reading data stored on the storage sled of FIG. 12.

Referring now to FIG. 18, in use, the storage sled 1200 may execute a method 1800 for reading data from the storage sled 1200. The method 1800 begins in block 1802, in which, if the storage sled 1200 is to read data (e.g., a request to read data was received by the communication circuit 1210 from another device, such as a compute sled 204-4), the method proceeds to block 1804. Otherwise, if the storage sled 1200 is not to read data (e.g., no request for reading data was received), the method 1800 loops back to block 1802 in which the storage sled 1200 continues to monitor for a read request.

In block 1804, the storage sled receives a request for data (e.g., the storage controller 1502 may receive a request from the communication engine 1504). In block 1806, the storage sled reads metadata associated with the data from the low-latency non-volatile memory 1212. In some embodiments, the storage sled 1200 may decrypt the metadata with a volatile encryption key in block 1808.

In block 1810, the storage sled 1200 reads the data from the data storage 1208 based on the metadata. In block 1812, the storage sled 1200 sends the data to the requesting device, such as to a compute sled 204-4.

Figure 19:
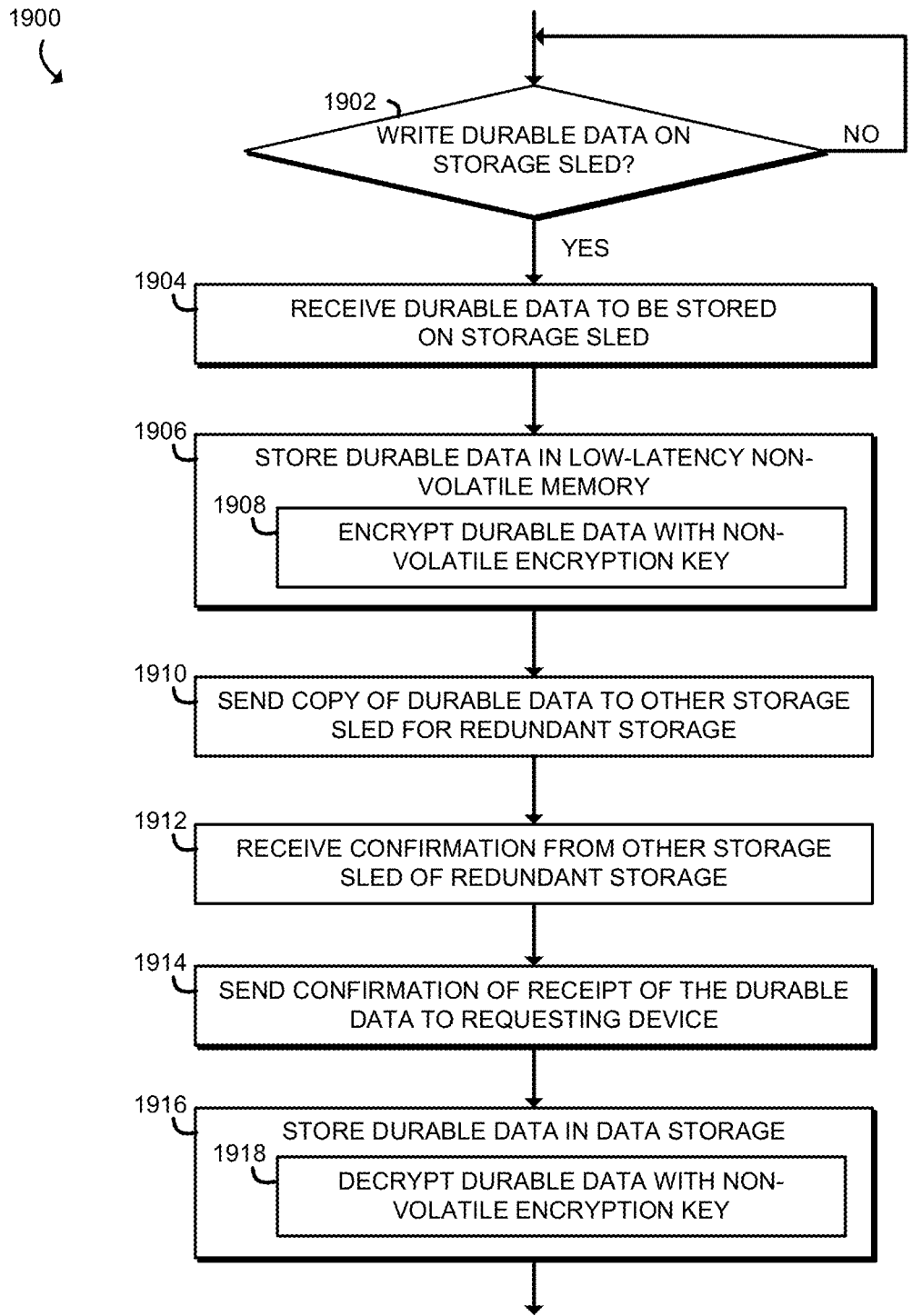
FIG. 19 is at least one embodiment of a flowchart of a method for storing durable data on the storage sled of FIG. 12.

Referring now to FIG. 19, in use, the storage sled 1200 may execute a method 1900 for writing durable data on the storage sled 1200. The method 1900 begins in block 1902, in which, if the storage sled 1200 is to store data (e.g., a request to store data was received), the method proceeds to block 1904. Otherwise, if the storage sled 1200 is not to read data (e.g., no request for reading data was received), the method 1900 loops back to block 1902.

In block 1904, the storage sled 1200 receives the durable data to be stored on the storage sled 1200. In block 1906, the storage sled 1200 stores the durable data in low-latency non-volatile memory 1212. The storage sled 1200 may store the durable data in the low-latency non-volatile memory 1212 by storing the durable data immediately after receipt from the communication circuit 1210 or by first storing the durable data in another portion of the memory 1204 (such as DRAM) and then copying the durable data to the low-latency non-volatile memory 1212. In some embodiments, the storage sled 1200 encrypts the durable data with a non-volatile encryption key in block 1908.

In block 1910, in some embodiments, the storage sled 1200 may send a copy of the durable data to another storage sled 1200 for redundant storage. In such embodiments, the storage sled 1200 may then receive an acknowledgement from the other storage sled 1200 of receipt of the durable data in block 1912.

In block 1914, the storage sled sends a confirmation of receipt of the durable data to the requesting device, such as a compute sled 204-4. In block 1916, the storage sled 1200 may store the durable data in the data storage 1208. In some embodiments, the storage sled 1200 may decrypt the durable data with the non-volatile encryption key in block 1918.

EXAMPLES

Illustrative examples of the devices, systems, and methods disclosed herein are provided below. An embodiment of the devices, systems, and methods may include any one or more, and any combination of, the examples described below.

Example 1 includes a storage sled for a low-latency interface to data storage of the storage sled in a data center, the storage sled comprising a communication engine to receive, from a compute sled of the data center, a request for data stored on the data storage; a storage controller to read, from a low-latency non-volatile memory of the storage sled, metadata indicative of a location of the data on the data storage; and retrieve, based on the metadata, the data from the location of the data storage, wherein the communication engine is further to send, to the compute sled, the retrieved data in response to the request for the data, and wherein a latency for a read of the metadata from the low-latency non-volatile memory is less than a latency for a retrieval of the data from the data storage.

Example 2 includes the subject matter of Example 1, and wherein the communication engine is further to receive, from the compute sled, the data for storage prior to receipt of the request for the data, wherein the storage controller is further to determine the location of the data storage at which to store the data; store the data at the location of the data storage; store the metadata indicative of the location in the low-latency non-volatile memory.

Example 3 includes the subject matter of any of Examples 1 and 2, and wherein the storage controller is further to encrypt, by the low-latency non-volatile memory, the metadata in the low-latency non-volatile memory with a volatile encryption key.

Example 4 includes the subject matter of any of Examples 1-3, and wherein the data storage comprises NAND flash memory and wherein to retrieve the data from the location of the data storage comprises to retrieve the data from the location of the NAND flash memory.

Example 5 includes the subject matter of any of Examples 1-4, and wherein the low-latency non-volatile memory is a byte-addressable write-in-place memory.

Example 6 includes the subject matter of any of Examples 1-5, and wherein the byte-addressable write-in-place memory comprises at least one of a chalcogenide phase change material, a 3-dimensional cross point memory, a ferroelectric transistor random-access memory, a nanowire-based non-volatile memory, a phase change memory, a memory that incorporates memristor technology, a magnetoresistive random-access memory (MRAM), and a spin torque transfer MRAM.

Example 7 includes the subject matter of any of Examples 1-6, and wherein the data storage comprises byte-addressable, write-in-place non-volatile memory wherein to retrieve the data from the location of the data storage comprises to retrieve the data from the location of the byte-addressable, write-in-place non-volatile memory.

Example 8 includes the subject matter of any of Examples 1-7, and wherein the data storage comprises a plurality of storage devices in a storage cage and wherein the low-latency non-volatile memory is not in the storage cage.

Example 9 includes the subject matter of any of Examples 1-8, and wherein the low-latency non-volatile memory is in a dual in-line memory module (DIMM) package.

Example 10 includes the subject matter of any of Examples 1-9, and wherein a capacity of the data storage is at least 500 terabytes and wherein a capacity of the low-latency non-volatile memory is at least 0.25% of the capacity of the data storage.

Example 11 includes the subject matter of any of Examples 1-10, and wherein the latency for a retrieval of the metadata from the data storage is at least ten times the latency for a read of the data from the low-latency non-volatile memory.

Example 12 includes a storage sled for a low-latency interface to data storage of the storage sled in a data center, the storage sled comprising a communication engine to receive, from a compute sled of the data center, durable data to be stored on the storage sled; a storage controller to store the durable data in a low-latency non-volatile memory of the storage sled; and store the durable data in the data storage, wherein the communication engine is further to send, to the compute sled and in response to storage of the durable data in the low-latency non-volatile memory, confirmation of receipt of the durable data prior to storage of the durable data in the data storage, and wherein a latency of a storage of the durable data in the low-latency non-volatile memory is less than a latency of a storage of the durable data in the data storage.

Example 13 includes the subject matter of Example 12, and wherein the communication engine is further to send, to another storage sled, the durable data prior to transmission of the confirmation of receipt of the durable data; and receive, from the other storage sled, an acknowledgement of receipt of the durable data prior to transmission of the confirmation of receipt of the durable data.

Example 14 includes the subject matter of any of Examples 12 and 13, and wherein to store the durable data in the low-latency non-volatile memory comprises to encrypt, by the low-latency non-volatile memory, the durable data in the low-latency non-volatile memory with a non-volatile encryption key, and wherein to store the durable data in the data storage comprises to decrypt, by the low-latency non-volatile memory, the durable data.

Example 15 includes the subject matter of any of Examples 12-14, and wherein the data storage comprises NAND flash memory and wherein to store the durable data in the data storage comprises to store the durable data in the NAND flash memory.

Example 16 includes the subject matter of any of Examples 12-15, and wherein the low-latency non-volatile memory is a byte-addressable write-in-place memory.

Example 17 includes the subject matter of any of Examples 12-16, and wherein the byte-addressable write-in-place memory comprises at least one of a chalcogenide phase change material, a 3-dimensional cross point memory, a ferroelectric transistor random-access memory, a nanowire-based non-volatile memory, a phase change memory, a memory that incorporates memristor technology, a magnetoresistive random-access memory (MRAM), and a spin torque transfer MRAM.

Example 18 includes the subject matter of any of Examples 12-17, and wherein the data storage comprises byte-addressable, write-in-place non-volatile memory and wherein to store the durable data in the data storage comprises to store the durable data in the byte-addressable, write-in-place non-volatile memory.

Example 19 includes the subject matter of any of Examples 12-18, and wherein the data storage comprises a plurality of storage devices in a storage cage and wherein the low-latency non-volatile memory is not in the storage cage.

Example 20 includes the subject matter of any of Examples 12-19, and wherein the low-latency non-volatile memory is in a dual in-line memory module (DIMM) package.

Example 21 includes the subject matter of any of Examples 12-20, and wherein the latency for a storage of the durable data in the data storage is at least ten times the latency for a storage of the durable data in the low-latency non-volatile memory.

Example 22 includes a method for a low-latency interface to data storage of a storage sled in a data center, the method comprising receiving, by the storage sled and from a compute sled of the data center, a request for data stored on the data storage; reading, by the storage sled and from low-latency non-volatile memory of the storage sled, metadata indicative of a location of the data on the data storage; retrieving, by the storage sled and based on the metadata, the data from the location of the data storage; and sending, by the storage sled and to the compute sled, the data in response to the request for the data, wherein a latency for retrieving the metadata from the low-latency non-volatile memory is less than a latency for reading the data from the data storage.

Example 23 includes the subject matter of Example 22, and further including receiving, by the storage sled and from the compute sled, the data for storage prior to receiving the request for the data; determining, by the storage sled, the location of the data storage at which to store the data; storing, by the storage sled, the data at the location of the data storage; storing, by the storage sled, the metadata indicative of the location in the low-latency non-volatile memory.

Example 24 includes the subject matter of any of Examples 22 and 23, and further including encrypting, by the low-latency non-volatile memory, the metadata in the low-latency non-volatile memory with a volatile encryption key.

Example 25 includes the subject matter of any of Examples 22-24, and wherein the data storage comprises NAND flash memory and wherein retrieving the data from the location of the data storage comprises retrieving the data from the location of the NAND flash memory.

Example 26 includes the subject matter of any of Examples 22-25, and wherein the low-latency non-volatile memory is a byte-addressable write-in-place memory.

Example 27 includes the subject matter of any of Examples 22-26, and wherein the byte-addressable write-in-place memory comprises at least one of a chalcogenide phase change material, a 3-dimensional cross point memory, a ferroelectric transistor random-access memory, a nanowire-based non-volatile memory, a phase change memory, a memory that incorporates memristor technology, a magnetoresistive random-access memory (MRAM), and a spin torque transfer MRAM.

Example 28 includes the subject matter of any of Examples 22-27, and wherein the data storage comprises byte-addressable, write-in-place non-volatile memory and wherein retrieving the data from the location of the data storage comprises retrieving the data from the location of the byte-addressable, write-in-place non-volatile memory.

Example 29 includes the subject matter of any of Examples 22-28, and wherein the data storage comprises a plurality of storage devices in a storage cage and wherein the low-latency non-volatile memory is not in the storage cage.

Example 30 includes the subject matter of any of Examples 22-29, and wherein the low-latency non-volatile memory is in a dual in-line memory module (DIMM) package.

Example 31 includes the subject matter of any of Examples 22-30, and wherein a capacity of the data storage is at least 500 terabytes and wherein a capacity of the low-latency non-volatile memory is at least 0.25% of the capacity of the data storage.

Example 32 includes the subject matter of any of Examples 22-31, and wherein the latency for retrieving the metadata from the data storage is at least ten times the latency for reading the data from the low-latency non-volatile memory.

Example 33 includes a method for a low-latency interface to data storage of a storage sled in a data center, the method comprising receiving, by the storage sled and from a compute sled, durable data to be stored on the storage sled; storing, by the storage sled, the durable data in a low-latency non-volatile memory of the storage sled; sending, by the storage sled and to the compute sled, confirmation of receipt of the durable data in response to storing the durable data in the low-latency non-volatile memory; and storing, by the storage sled, the durable data in the data storage, wherein a latency of storing the durable data in the low-latency non-volatile memory is less than a latency of storing the durable data in the data storage, and wherein sending the confirmation of receipt of the durable data comprises sending the confirmation of receipt of the durable data prior to storing the durable data in the data storage.

Example 34 includes the subject matter of Example 33, and further including sending, by the storage sled and to another storage sled, the durable data prior to sending the confirmation of receipt of the durable data; and receiving, by the storage sled and from the other storage sled, an acknowledgement of receipt of the durable data prior to sending the confirmation of receipt of the durable data.

Example 35 includes the subject matter of any of Examples 33 and 34, and wherein storing the durable data in the low-latency non-volatile memory comprises encrypting, by the low-latency non-volatile memory, the durable data in the low-latency non-volatile memory with a non-volatile encryption key, and wherein storing the durable data in the data storage comprises decrypting, by the low-latency non-volatile memory, the durable data.

Example 36 includes the subject matter of any of Examples 33-35, and wherein the data storage comprises NAND flash memory and wherein storing the durable data in the data storage comprises storing the durable data in the NAND flash memory.

Example 37 includes the subject matter of any of Examples 33-36, and wherein the low-latency non-volatile memory is a byte-addressable write-in-place memory.

Example 38 includes the subject matter of any of Examples 33-37, and wherein the byte-addressable write-in-place memory comprises at least one of a chalcogenide phase change material, a 3-dimensional cross point memory, a ferroelectric transistor random-access memory, a nanowire-based non-volatile memory, a phase change memory, a memory that incorporates memristor technology, a magnetoresistive random-access memory (MRAM), and a spin torque transfer MRAM.

Example 39 includes the subject matter of any of Examples 33-38, and wherein the data storage comprises byte-addressable, write-in-place non-volatile memory and wherein storing the durable data in the data storage comprises storing the durable data in the byte-addressable, write-in-place non-volatile memory.

Example 40 includes the subject matter of any of Examples 33-39, and wherein the data storage comprises a plurality of storage devices in a storage cage and wherein the low-latency non-volatile memory is not in the storage cage.

Example 41 includes the subject matter of any of Examples 33-40, and wherein the low-latency non-volatile memory is in a dual in-line memory module (DIMM) package.

Example 42 includes the subject matter of any of Examples 33-41, and wherein the latency for storing the durable data in the data storage is at least ten times the latency for storing the durable data in the low-latency non-volatile memory.

Example 43 includes one or more computer-readable media comprising a plurality of instructions stored thereon that, when executed, causes a sled to perform the method of any of Examples 22-42.

Example 44 includes a storage sled for a low-latency interface to data storage of the storage sled in a data center, the storage sled comprising means for receiving, from a compute sled of the data center, a request for data stored on the data storage; means for reading, from low-latency non-volatile memory of the storage sled, metadata indicative of a location of the data on the data storage; means for retrieving, based on the metadata, the data from the location of the data storage; and means for sending, to the compute sled, the data in response to the request for the data, wherein a latency for retrieving the metadata from the low-latency non-volatile memory is less than a latency for reading the data from the data storage.

Example 45 includes the subject matter of Example 44, and further including means for receiving, from the compute sled, the data for storage prior to receiving the request for the data; means for determining the location of the data storage at which to store the data; means for storing the data at the location of the data storage; means for storing the metadata indicative of the location in the low-latency non-volatile memory.

Example 46 includes the subject matter of any of Examples 44 and 45, and further including means for encrypting, by the low-latency non-volatile memory, the metadata in the low-latency non-volatile memory with a volatile encryption key.

Example 47 includes the subject matter of any of Examples 44-46, and wherein the data storage comprises NAND flash memory and wherein the means for retrieving the data from the location of the data storage comprises means for retrieving the data from the location of the NAND flash memory.

Example 48 includes the subject matter of any of Examples 44-47, and wherein the low-latency non-volatile memory is a byte-addressable write-in-place memory.

Example 49 includes the subject matter of any of Examples 44-48, and wherein the byte-addressable write-in-place memory comprises at least one of a chalcogenide phase change material, a 3-dimensional cross point memory, a ferroelectric transistor random-access memory, a nanowire-based non-volatile memory, a phase change memory, a memory that incorporates memristor technology, a magnetoresistive random-access memory (MRAM), and a spin torque transfer MRAM.

Example 50 includes the subject matter of any of Examples 44-49, and wherein the data storage comprises byte-addressable, write-in-place non-volatile memory and wherein the means for retrieving the data from the location of the data storage comprises means for retrieving the data from the location of the byte-addressable, write-in-place non-volatile memory.

Example 51 includes the subject matter of any of Examples 44-50, and wherein the data storage comprises a plurality of storage devices in a storage cage and wherein the low-latency non-volatile memory is not in the storage cage.

Example 52 includes the subject matter of any of Examples 44-51, and wherein the low-latency non-volatile memory is in a dual in-line memory module (DIMM) package.

Example 53 includes the subject matter of any of Examples 44-52, and wherein a capacity of the data storage is at least 500 terabytes and wherein a capacity of the low-latency non-volatile memory is at least 0.25% of the capacity of the data storage.

Example 54 includes the subject matter of any of Examples 44-53, and wherein the latency for retrieving the metadata from the data storage is at least ten times the latency for reading the data from the low-latency non-volatile memory.

Example 55 includes a storage sled for a low-latency interface to data storage of the storage sled in a data center, the storage sled comprising means for receiving, from a compute sled, durable data to be stored on the storage sled; means for storing the durable data in a low-latency non-volatile memory of the storage sled; means for sending, to the compute sled, confirmation of receipt of the durable data in response to storing the durable data in the low-latency non-volatile memory; and means for storing the durable data in the data storage, wherein a latency of storing the durable data in the low-latency non-volatile memory is less than a latency of storing the durable data in the data storage, and wherein the means for sending the confirmation of receipt of the durable data comprises means for sending the confirmation of receipt of the durable data prior to storing the durable data in the data storage.

Example 56 includes the subject matter of Example 55, and further including means for sending, to another storage sled, the durable data prior to sending the confirmation of receipt of the durable data; and means for receiving, from the other storage sled, an acknowledgement of receipt of the durable data prior to sending the confirmation of receipt of the durable data.

Example 57 includes the subject matter of any of Examples 55 and 56, and wherein the means for storing the durable data in the low-latency non-volatile memory comprises means for encrypting, by the low-latency non-volatile memory, the durable data in the low-latency non-volatile memory with a non-volatile encryption key, and wherein the means for storing the durable data in the data storage comprises means for decrypting, by the low-latency non-volatile memory, the durable data.

Example 58 includes the subject matter of any of Examples 55-57, and wherein the data storage comprises NAND flash memory and wherein the means for storing the durable data in the data storage comprises means for storing the durable data in the NAND flash memory.

Example 59 includes the subject matter of any of Examples 55-58, and wherein the low-latency non-volatile memory is a byte-addressable write-in-place memory.

Example 60 includes the subject matter of any of Examples 55-59, and wherein the byte-addressable write-in-place memory comprises at least one of a chalcogenide phase change material, a 3-dimensional cross point memory, a ferroelectric transistor random-access memory, a nanowire-based non-volatile memory, a phase change memory, a memory that incorporates memristor technology, a magnetoresistive random-access memory (MRAM), and a spin torque transfer MRAM.

Example 61 includes the subject matter of any of Examples 55-60, and wherein the data storage comprises byte-addressable, write-in-place non-volatile memory and wherein the means for storing the durable data in the data storage comprises means for storing the durable data in the byte-addressable, write-in-place non-volatile memory.

Example 62 includes the subject matter of any of Examples 55-61, and wherein the data storage comprises a plurality of storage devices in a storage cage and wherein the low-latency non-volatile memory is not in the storage cage.

Example 63 includes the subject matter of any of Examples 55-62, and wherein the low-latency non-volatile memory is in a dual in-line memory module (DIMM) package.

Example 64 includes the subject matter of any of Examples 55-63, and wherein the latency for storing the durable data in the data storage is at least ten times the latency for storing the durable data in the low-latency non-volatile memory.

The invention claimed is:

1. A storage sled for a low-latency interface to data storage of the storage sled in a data center, the storage sled comprising:
   a communication engine to:
      receive, from a compute sled of the data center, durable data to be stored on the storage sled;
      send, to another storage sled, the durable data; and
      receive, from the other storage sled, an acknowledgement of receipt of the durable data;
   a storage controller to:
      store the durable data in a low-latency non-volatile memory of the storage sled; and
      store the durable data in the data storage,
   wherein the communication engine is further to send, to the compute sled and in response to (i) storage of the durable data in the low-latency non-volatile memory and (ii) receipt of the acknowledgement of receipt of the durable data by the other storage sled, confirmation of receipt of the durable data prior to storage of the durable data in the data storage, and
   wherein a latency of a storage of the durable data in the low-latency non-volatile memory is less than a latency of a storage of the durable data in the data storage.

2. The storage sled of claim 1, wherein to store the durable data in the low-latency non-volatile memory comprises to encrypt, by the low-latency non-volatile memory, the durable data in the low-latency non-volatile memory with a non-volatile encryption key, and wherein to store the durable data in the data storage comprises to decrypt, by the low-latency non-volatile memory, the durable data.

3. The storage sled of claim 1, wherein the data storage comprises NAND flash memory and wherein to store the durable data in the data storage comprises to store the durable data in the NAND flash memory.

4. The storage sled of claim 3, wherein the low-latency non-volatile memory is a byte-addressable write-in-place memory.

5. The storage sled of claim 4, wherein the byte-addressable write-in-place memory comprises at least one of a chalcogenide phase change material, a 3-dimensional cross point memory, a ferroelectric transistor random-access memory, a nanowire-based non-volatile memory, a phase change memory, a memory that incorporates memristor technology, a magnetoresistive random-access memory (MRAM), and a spin torque transfer MRAM.

6. The storage sled of claim 1, wherein the latency for a storage of the durable data in the data storage is at least ten times the latency for a storage of the durable data in the low-latency non-volatile memory.

7. The storage sled of claim 1, wherein the data storage comprises byte-addressable, write-in-place non-volatile memory and wherein to store the durable data in the data storage comprises to store the durable data in the byte-addressable, write-in-place non-volatile memory.

8. The storage sled of claim 1, wherein the data storage comprises a plurality of storage devices in a storage cage and wherein the low-latency non-volatile memory is not in the storage cage.

9. The storage sled of claim 1, wherein the low-latency non-volatile memory is in a dual in-line memory module (DIMM) package.

10. One or more non-transitory computer-readable media comprising a plurality of instructions stored thereon that, when executed, causes a storage sled to:
receive, from a compute sled of a data center, durable data to be stored on the storage sled;
store the durable data in a low-latency non-volatile memory of the storage sled;
store the durable data in data storage of the storage sled;
send, to another storage sled, the durable data; and
receive, from the other storage sled, an acknowledgement of receipt of the durable data; and
send, to the compute sled and in response to storage of the durable data in the low-latency non-volatile memory, confirmation of receipt of the durable data prior to storage of the durable data in the data storage and after receipt of the acknowledgement of receipt of the durable data by the other storage sled, and
wherein a latency of a storage of the durable data in the low-latency non-volatile memory is less than a latency of a storage of the durable data in the data storage.

11. The one or more non-transitory computer-readable media of claim 10, wherein to store the durable data in the low-latency non-volatile memory comprises to encrypt, by the low-latency non-volatile memory, the durable data in the low-latency non-volatile memory with a non-volatile encryption key, and wherein to store the durable data in the data storage comprises to decrypt, by the low-latency non-volatile memory, the durable data.

12. The one or more non-transitory computer-readable media of claim 10, wherein the data storage comprises NAND flash memory and wherein to store the durable data in the data storage comprises to store the durable data in the NAND flash memory.

13. The one or more non-transitory computer-readable media of claim 10, wherein the latency for a storage of the durable data in the data storage is at least ten times the latency for a storage of the durable data in the low-latency non-volatile memory.

14. The one or more non-transitory computer-readable media of claim 13, wherein the low-latency non-volatile memory is a byte-addressable write-in-place memory.

15. The one or more non-transitory computer-readable media of claim 10, wherein the byte-addressable write-in-place memory comprises at least one of a chalcogenide phase change material, a 3-dimensional cross point memory, a ferroelectric transistor random-access memory, a nanowire-based non-volatile memory, a phase change memory, a memory that incorporates memristor technology, a magnetoresistive random-access memory (MRAM), and a spin torque transfer MRAM.

16. The one or more non-transitory computer-readable media of claim 10, wherein the data storage comprises byte-addressable, write-in-place non-volatile memory and wherein storing the durable data in the data storage comprises storing the durable data in the byte-addressable, write-in-place non-volatile memory.

17. The one or more non-transitory computer-readable media of claim 10, wherein the data storage comprises a plurality of storage devices in a storage cage and wherein the low-latency non-volatile memory is not in the storage cage.

18. The one or more non-transitory computer-readable media of claim 10, wherein the low-latency non-volatile memory is in a dual in-line memory module (DIMM) package.

19. A method for a low-latency interface to data storage of a storage sled in a data center, the method comprising:
receiving, by the storage sled and from a compute sled of the data center, durable data to be stored on the storage sled;
sending, by the storage sled and to another storage sled, the durable data;
receiving, by the storage sled and from the other storage sled, an acknowledgement of receipt of the durable data;
storing, by the storage sled, the durable data in a low-latency non-volatile memory of the storage sled;
storing, by the storage sled, the durable data in the data storage; and
sending, by the storage sled and to the compute sled and in response to (i) storage of the durable data in the low-latency non-volatile memory and (ii) receipt of the acknowledgement of receipt of the durable data by the other storage sled, confirmation of receipt of the durable data prior to storage of the durable data in the data storage,
wherein a latency of a storage of the durable data in the low-latency non-volatile memory is less than a latency of a storage of the durable data in the data storage.

20. The method of claim 19, wherein storing the durable data in the low-latency non-volatile memory comprises encrypting, by the low-latency non-volatile memory, the durable data in the low-latency non-volatile memory with a non-volatile encryption key, and wherein storing the durable data in the data storage comprises decrypting, by the low-latency non-volatile memory, the durable data.

21. The method of claim 19, wherein the data storage comprises NAND flash memory and wherein storing the durable data in the data storage comprises storing the durable data in the NAND flash memory.

22. The method of claim 21, wherein the low-latency non-volatile memory is a byte-addressable write-in-place memory.

23. The method of claim 22, wherein the byte-addressable write-in-place memory comprises at least one of a chalcogenide phase change material, a 3-dimensional cross point memory, a ferroelectric transistor random-access memory, a nanowire-based non-volatile memory, a phase change memory, a memory that incorporates memristor technology, a magnetoresistive random-access memory (MRAM), and a spin torque transfer MRAM.

24. The method of claim 19, wherein the data storage comprises byte-addressable, write-in-place non-volatile memory and wherein storing the durable data in the data storage comprises storing the durable data in the byte-addressable, write-in-place non-volatile memory.

25. The method of claim 19, wherein the data storage comprises a plurality of storage devices in a storage cage and wherein the low-latency non-volatile memory is not in the storage cage.

26. The method of claim 19, wherein the latency for a storage of the durable data in the data storage is at least ten times the latency for a storage of the durable data in the low-latency non-volatile memory.

* * * * *